United States Patent
Paul et al.

(10) Patent No.: US 9,703,994 B2
(45) Date of Patent: Jul. 11, 2017

(54) CHECK OF A SECURITY ELEMENT FURNISHED WITH MAGNETIC MATERIALS

(71) Applicant: GIESECKE & DEVRIENT GMBH, Munich (DE)

(72) Inventors: Elisabeth Paul, Raubling (DE); Armin Stockli, Ittigen (CH)

(73) Assignee: GIESECKE & DEVRIENT GMBH, Munich (DE)

( * ) Notice: Subject to any disclaimer, the term of this patent is extended or adjusted under 35 U.S.C. 154(b) by 51 days.

(21) Appl. No.: 14/781,260

(22) PCT Filed: Apr. 3, 2014

(86) PCT No.: PCT/EP2014/000890
§ 371 (c)(1),
(2) Date: Sep. 29, 2015

(87) PCT Pub. No.: WO2014/161668
PCT Pub. Date: Oct. 9, 2014

(65) Prior Publication Data
US 2016/0055358 A1 Feb. 25, 2016

(30) Foreign Application Priority Data
Apr. 3, 2013 (DE) .......... 10 2013 205 891

(51) Int. Cl.
*G06K 7/08* (2006.01)
*G07D 7/04* (2016.01)

(52) U.S. Cl.
CPC ............ *G06K 7/087* (2013.01); *G07D 7/04* (2013.01)

(58) Field of Classification Search
CPC ....... G06K 19/06187; G06K 19/06196; G06K 7/084
See application file for complete search history.

(56) References Cited

U.S. PATENT DOCUMENTS 6,053,406 A * 4/2000 Litman .................. G06K 7/084
235/449
8,387,879 B2 * 3/2013 Schutzmann ............ G07D 7/04
235/435
(Continued)

FOREIGN PATENT DOCUMENTS

DE 102011106263 A1 12/2011
DE 102011110138 A1 2/2013
DE 102011120972 A1 6/2013

OTHER PUBLICATIONS

German Search Report for corresponding German Application No. 102013205891.8, Oct. 24, 2013.
(Continued)

*Primary Examiner* — Thien M Le
*Assistant Examiner* — April Taylor
(74) *Attorney, Agent, or Firm* — Workman Nydegger

(57) ABSTRACT

Checking of security elements for value documents, which have a plurality of magnetic regions, includes at least a high-coercivity magnetic region having a high-coercivity magnetic material, a low-coercivity magnetic region having a low-coercivity magnetic material, and, where applicable, a combined magnetic region containing both the high-coercivity and the low-coercivity magnetic material. After magnetization of all magnetic materials or the magnetic regions formed therefrom in one direction with a first magnetic field region, only the low-coercivity magnetic material is remagnetized in another direction in a subsequent second magnetic field region. Magnetic signals of the magnetic regions are captured while the security element is still subjected to the second magnetic field region. On the basis of the signals all three types of magnetic region can be reliably distinguished.

15 Claims, 13 Drawing Sheets

(56) References Cited

U.S. PATENT DOCUMENTS

| | | | |
|---|---|---|---|
| 8,544,630 B2* | 10/2013 | Schutzmann | G07D 7/04 |
| | | | 194/214 |
| 8,910,869 B2 | 12/2014 | Schutzmann et al. | |
| 2009/0008922 A1* | 1/2009 | Schutzmann | G06K 19/12 |
| | | | 283/67 |
| 2013/0082105 A1 | 4/2013 | Schutzmann et al. | |
| 2014/0312894 A1 | 10/2014 | Bartos et al. | |
| 2014/0367469 A1 | 12/2014 | Schutzmann | |

OTHER PUBLICATIONS

International Search Report for corresponding International PCT Application No. PCT/EP2014/000890, Jul. 17, 2014.

* cited by examiner

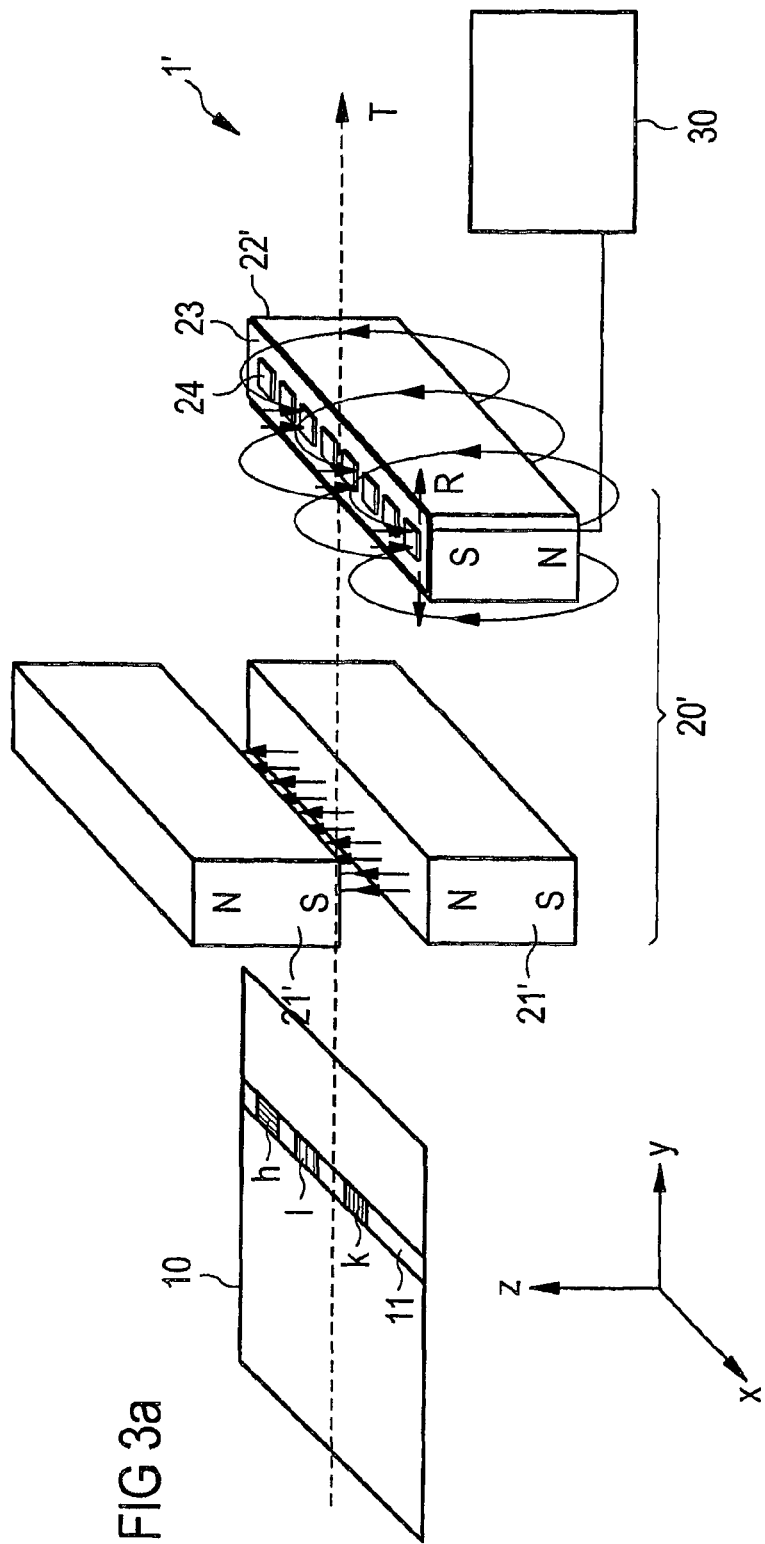

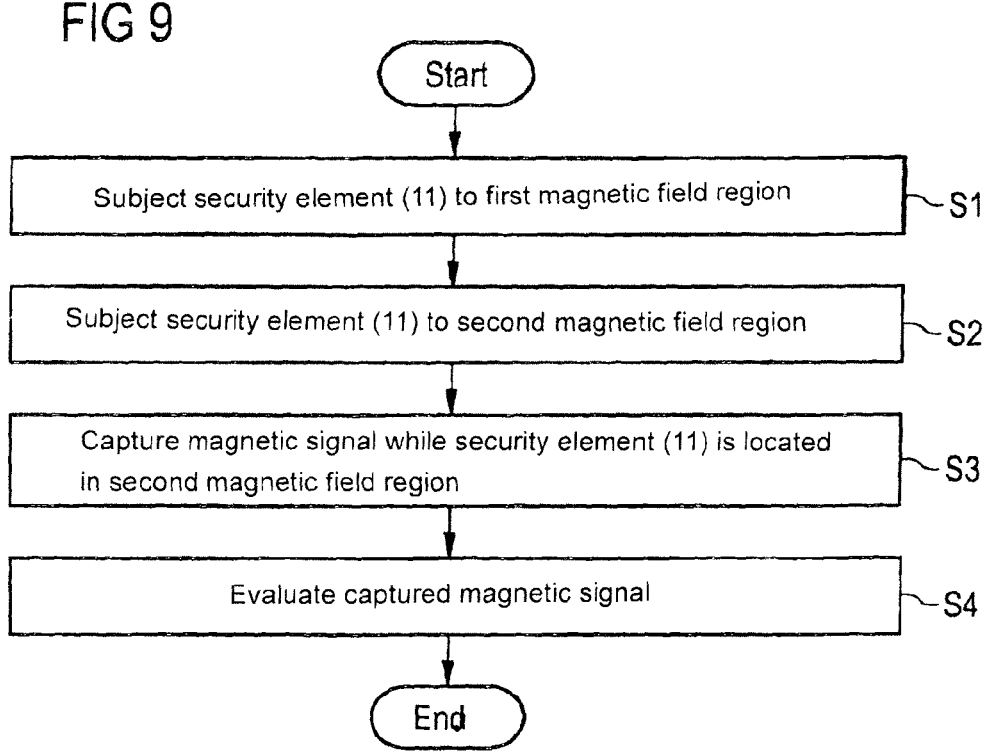

CHECK OF A SECURITY ELEMENT FURNISHED WITH MAGNETIC MATERIALS

BACKGROUND

The present invention concerns a method and an apparatus for checking a security element which is furnished with a plurality of magnetic materials of different coercive field strength.

From DE 10 2011 106 263 A1 is known a checking method for checking such security elements. The security elements to be checked are furnished in different regions with a first magnetic material having a first coercive field strength and a second magnetic material having a second coercive field strength that is smaller than the first coercive field strength. In some regions the two magnetic materials are also provided jointly. Said regions form a magnetic code which can be checked.

For checking, it is provided to first subject the security element to a first, stronger magnetic field which is strong enough to magnetize both magnetic materials in a first direction, i.e. which has a magnetic field strength that is greater than the two above-mentioned coercive field strengths. Subsequently, the security element is subjected to a second, weaker magnetic field which has a magnetic field strength that is smaller than the first coercive field strength and is greater than the second coercive field strength and accordingly aligns the magnetization of the second magnetic material in a direction different from the magnetization direction of the first magnetic material. Then the magnetization of the security element is measured in a spatially resolved manner. From the thereby captured magnetic signal it is then derived where magnetic regions having only the first magnetic material and magnetic regions having only the second magnetic material are located. From the two different magnetic regions there are captured magnetic signals (e.g. magnetic flux densities or signals proportional thereto) which are substantially inverse to each other (i.e. signals with opposite signs).

When the magnetic materials of the two above-mentioned types mutually overlap, i.e. form a combined magnetic region having both magnetic materials, their magnetic signals can accordingly cancel each other out completely or nearly completely, so that such combined magnetic regions are not detected.

This problem is solved in DE 10 2011 106 263 by the security element being subsequently magnetized in a third magnetization direction as well, and further magnetic signals being captured on the basis of which the above-mentioned combined magnetic regions are also reliably detectable. This makes the checking method elaborate, however.

SUMMARY

The object of the present invention is consequently to propose a method and an apparatus that enable the above-described combined magnetic regions to be detected less elaborately.

In the method according to the invention, there is checked as in the prior art a security element having a first magnetic material having a first, greater coercive field strength, and a second magnetic material having a second, smaller coercive field strength. The security element comprises at least a first magnetic region which has the first but not the second magnetic material, and a second magnetic region which has the second and not the first magnetic material. Furthermore, the security element can also comprise at least a third magnetic region which has both magnetic materials.

In the method, the security element, as in the prior art, is first subjected to a first magnetic field region in which the two magnetic materials are premagnetized in a first magnetization direction. For this purpose there must be present in said region a first magnetic field strength which is both greater than the first coercive field strength and greater than the second coercive field strength. Preferably, it is at least 1.5, more preferably at least 1.75, or even at least 2, times as great as the greater of the two coercive field strengths. A magnetic field region designates in connection with the present invention a contiguous region of a total magnetic field generated by a magnetization apparatus.

Subsequently, the security element is subjected to a second magnetic field region by which the second magnetic material is aligned in a second magnetization direction differing from the first magnetization direction. In the second magnetic field region there is accordingly present a second magnetic field strength which is greater than the second coercive field strength. Moreover, the magnetic field strength is smaller than the first coercive field strength everywhere in the second magnetic field region, so that the first magnetic material is not aligned in the second magnetization direction, but rather remains magnetized (at least substantially) in the first magnetization direction.

According to the invention, a magnetic signal emanating from one or more magnetic regions is now, for checking the security element, captured exactly when the security element and thus the relevant magnetic region from which the magnetic signal emanates is subjected to the second magnetic field region and thus to the second magnetic field strength.

Thereafter the captured magnetic signal is evaluated. In so doing, it is derived from the captured magnetic signal, without any further magnetic signals of the relevant magnetic region being captured and evaluated, whether the relevant magnetic region has the first magnetic material or the second magnetic material or, if the evaluation device is adapted accordingly, both magnetic materials, where applicable. The type of magnetic region is thus ascertained. Preferably, the position of the relevant magnetic region is also ascertained.

The invention is based on the finding that the absolute value of the magnetic signal (e.g. of a measured magnetic flux density or of a signal proportional thereto) of the second magnetic material differs more strongly from the absolute value of the magnetic signal of the first magnetic material as long as the security element is still subjected to the second magnetic field strength.

Accordingly, the third (combined) magnetic regions can also be detected with the method according to the invention, if it is desired and an evaluation device is adapted accordingly, since the magnetic signals of the two magnetic materials clearly differ in their absolute value, so that they do not cancel each other out out when superimposed, even if they have inverse signs, where applicable.

According to the invention, the coercive field strength of the second magnetic material is lower than that of the first magnetic material. Preferably, both coercive field strengths are clearly greater than zero. For example, the coercive field strength of the second magnetic material can amount to at least 4, 8 or 16 kA/m (approx. 50, 100 or 200 Oe (oersted)). However, the second magnetic material can also be a soft-magnetic magnetic material, which is understood in the present case to be a magnetic material having a coercive field strength that amounts to zero or nearly zero, and the first magnetic material an arbitrary magnetic material having a coercive field strength that is greater in comparison therewith (non-soft-magnetic material). The magnetic field strength of the second magnetic field region must of course nevertheless be significantly greater than zero, and can amount for example to at least one five-hundredth or one two-hundredth or one hundredth of the magnetic field strength of the first magnetic field region.

As described hereinabove, the security element is first subjected to a first magnetic field region in which the two magnetic materials are premagnetized in a first magnetization direction. Preferably, the security element is subsequently subjected to the second magnetic field region while being thus premagnetized. "Thus premagnetized" means that the security element, before being subjected to the second magnetic field region, is not subjected to any further magnetic field region, lying between the first and the second magnetic field region, of another magnetic field, and thereby remagnetized by said further region.

A checking apparatus according to the invention for checking the security element accordingly possesses a transport line along which the security element is movable in a transport direction, a magnetization apparatus, a sensor and an evaluation device.

The magnetization apparatus supplies the first magnetic field region having the first magnetic field strength in a first region of the transport line to thereby magnetize the two magnetic materials in the first magnetic field region in the first magnetization direction. The magnetization apparatus moreover supplies the second magnetic field region, following the first magnetic field region along the transport line, having the second magnetic field strength which is smaller (in terms of absolute value) than the first magnetic field strength and which is in addition greater than the second coercive field strength of the second magnetic material and smaller than the first coercive field strength of the first magnetic material. Thus, the security element can be moved along the transport line from the first into the subsequent second magnetic field region in order to remagnetize the second magnetic material, premagnetized in the first magnetic field region, in the second region in the second magnetization direction differing from the first magnetization direction.

The sensor captures the magnetic signal from at least one of the magnetic regions of the security element. It is for this purpose adapted to capture magnetic signals that emanate from the second magnetic field region, i.e. the magnetic signal is captured while the security element is located in the second magnetic field region and is subjected to the second magnetic field strength. The sensor of the checking apparatus accordingly captures magnetic signals that emanate from a second region of the transport line on which region the second magnetic field region acts.

The captured magnetic signal is then evaluated by the evaluation device as described hereinabove.

According to a preferred embodiment, the second magnetic field region lies here in a core region of the total magnetic field generated by the magnetization apparatus (or a corresponding second magnetization device). This enables an uncomplicated and simply realized construction of the employed apparatus and leads to reliable results.

A core region designates here the region in which the total magnetic field assumes a local or global maximum magnetic field strength, e.g. a local maximum magnetic field strength of the total magnetic field with respect to the transport line along which the security element is movable. For example, there can be present in the core region a magnetic field strength that amounts to at least 25%, preferably at least 50% or even at least 75%, of the maximum magnetic field strength everywhere in the core region.

Preferably, the magnetic field having the second magnetic field strength in the second magnetic field region extends substantially opposite to the first magnetization direction. Therefore, the second magnetic material is aligned in a second magnetization direction that is substantially opposite to the first magnetization direction. Consequently, there is an especially strong quantitative difference between the magnetic signals generated by the two magnetic materials, i.e. they are substantially inverse to each other and furthermore possess a course similar in shape and having different absolute values.

Alternatively, the magnetic field having the second magnetic field strength in the second magnetic field region can also extend substantially perpendicularly to the first magnetization direction. Then there results an especially strong difference of the shape of the courses of the magnetic signals generated by the two magnetic materials.

Moreover, the magnetic field having the second magnetic field strength can of course also extend at an arbitrary other angle to the first magnetization direction.

Upon the capturing of the magnetic signal, the magnetic flux density generated by the magnetization of the security element can be captured in an arbitrary direction. According to a preferred embodiment, upon the capturing of the magnetic signal, the magnetic flux density generated by the security element is captured in a direction extending substantially perpendicularly to a magnetic field direction of the second magnetic field region, to which the security element is subjected upon the capturing. Since in this case the magnetic field acting on the security element upon the capturing extends substantially perpendicularly to the capture direction, the captured magnetic signal is influenced at most slightly by said magnetic field, i.e. substantially only the magnetic signal of the magnetic region is captured without superimposed spurious signals. Therefore, the evaluation of the magnetic signal is facilitated, and the sensor is less likely to go into saturation.

In an alternative embodiment, the magnetic flux density generated by the security element is captured in a direction extending substantially parallel or anti-parallel to the magnetic field direction of the second magnetic field region. This can result in a magnetic signal course that is simpler to evaluate. In particular when the magnetic field direction of the second magnetic field region acting on the security element upon the capturing in addition extends substantially opposite to the first magnetization direction, there is captured from all three types of magnetic region a signal consisting substantially only of a single peak whose amplitude and sign, where applicable, depends on the type of magnetic region.

Preferably, the magnetic field direction of the second magnetic field region extends substantially perpendicularly or substantially parallel to a principal plane of the security element. This enables an especially simple generation of the second magnetic field region. In particular, the second magnetic field region having a second magnetic field direction extending parallel to the principal plane can be generated by means of a magnet pair, consisting of one magnet arranged above and one below the principal plane, by arranging the magnets such that two like poles face each other. On the other hand, a magnetic field direction extending perpendicularly to the principal plane can be generated by arranging the magnets such that two unlike poles face each other.

The same of course also holds for the first magnetic field region, whose magnetic field preferably likewise (or also alternatively to the second magnetic field region) extends perpendicularly or parallel to the principal plane of the security element.

The two magnetic field regions can be generated by means of separate, i.e. mutually separated, magnetization devices. Alternatively, however, there can also be employed a magnetization apparatus that comprises a permanent or electromagnet arranged on one side of the transport line, which generates both the first and the second magnetic field region or at least predominantly generates them, or that comprises two permanent or electromagnets arranged on opposing sides of the transport line, which cooperatively generate both the first and the second magnetic field region or at least predominantly generate them.

The term "predominantly generate" expresses here that a decisive part (e.g. at least 50% or at least 90%) of the respective magnetic field strengths of the two magnetic field regions is generated by the above-mentioned magnet or magnets.

A single permanent magnet also refers here to a plurality of separately shaped but series-connected permanent magnets. Such series-connected permanent magnets can e.g. border on each other directly with unlike poles or also be connected via magnetically conductive materials, in particular ferromagnetic materials, particularly preferably soft-magnetic materials or air gaps with unlike poles of the respective nearest magnet.

Both in the present invention and in the prior art stated at the outset, a plurality of consecutive magnetic field regions with different magnetic field strengths and directions are generated along a transport line. The above-described magnetization apparatus can consequently also be advantageously used in other methods not in accordance with the invention and is hence regarded as independently inventive.

The invention comprises not only the above-mentioned method and the above-mentioned checking apparatus but equally concerns a sensor device having the above-described magnetization apparatus. Such sensor devices can be used e.g. to subsequently fit existing checking apparatuses. Such sensor devices are independently marketable products. When subsequently fitting an existing checking apparatus one must substantially only reprogram the evaluation device of the checking apparatus accordingly to carry out the above-described method.

A corresponding sensor device for checking a security element which has a plurality of magnetic regions with magnetic materials of different coercive field strength accordingly comprises a magnetization apparatus and a sensor.

The magnetization apparatus of the sensor device supplies the first magnetic field region having the first magnetic field strength in the first region of the transport line along which the security element is movable in a transport direction, and magnetizes magnetic material, located in the first magnetic field region, of the security element to be checked in the first magnetization direction. Moreover, the magnetization apparatus supplies the second magnetic field region downstream of the first magnetic field region in a second region of the transport line having the second magnetic field strength which is smaller than the first magnetic field strength, and magnetizes magnetic material, located in the second magnetic field region, of the security element to be checked in a second magnetization direction differing from the first magnetization direction. Thus, the magnetic material magnetized in the first magnetization direction in the second magnetic field region can be aligned in the second magnetization direction. The second magnetic field region lies, as described hereinabove, preferably in a core region of the total magnetic field generated by the magnetization apparatus.

The sensor of the sensor device captures the magnetic signal from at least one of the magnetic regions of the security element to be checked. It is adapted to capture magnetic signals that emanate from the second magnetic field region in order to capture the magnetic signal while the security element is subjected to the second magnetic field strength of the second magnetic field region. The magnetization apparatus of the sensor device comprises a permanent or electromagnet arranged on one side of the transport line, which generates both the first and the second magnetic field region or at least predominantly generates them, or two permanent or electromagnets arranged on opposing sides of the transport line, which cooperatively generate both the first and the second magnetic field region or at least predominantly generate them.

The one or the two mutually facing magnets can be connected to an arrangement made of magnetically conductive material, which guides the magnetic field from the one or from the two mutually facing magnets to the first and/or to the second magnetic field region. The first and/or the second magnetic field region are generated in particular by the magnetic field lines of the magnetic field generated by the one or by the two mutually facing magnets being guided with the help of the arrangement made of magnetically conductive material, to which the magnet or the two magnets are connected, from the one magnet or from the two mutually facing magnets to the first and/or to the second magnetic field region. The second magnetic field region in which the sensor is located can be generated by two mutually facing portions of the magnetically conductive material or by a single portion, arranged only on one side of the transport line, of the magnetically conductive material. The latter is less vulnerable to mechanical fluctuations.

The security element can be e.g. part of a security paper or value document, such as a bank note, a check, a share, a debenture or an arbitrary other value document, or of a security article, such as a product identification tag, a ticket, etc.

BRIEF DESCRIPTION OF THE DRAWINGS

Further features and advantages of the invention will result from the following description of exemplary embodiments according to the invention as well as of further alternative embodiments in connection with the attached drawings, which show schematically:

FIG. 3a: a checking apparatus according to the invention for checking a security element according to a third embodiment, FIG. 9: steps of the checking method.

DETAILED DESCRIPTION OF VARIOUS EMBODIMENTS

Figure 1A:
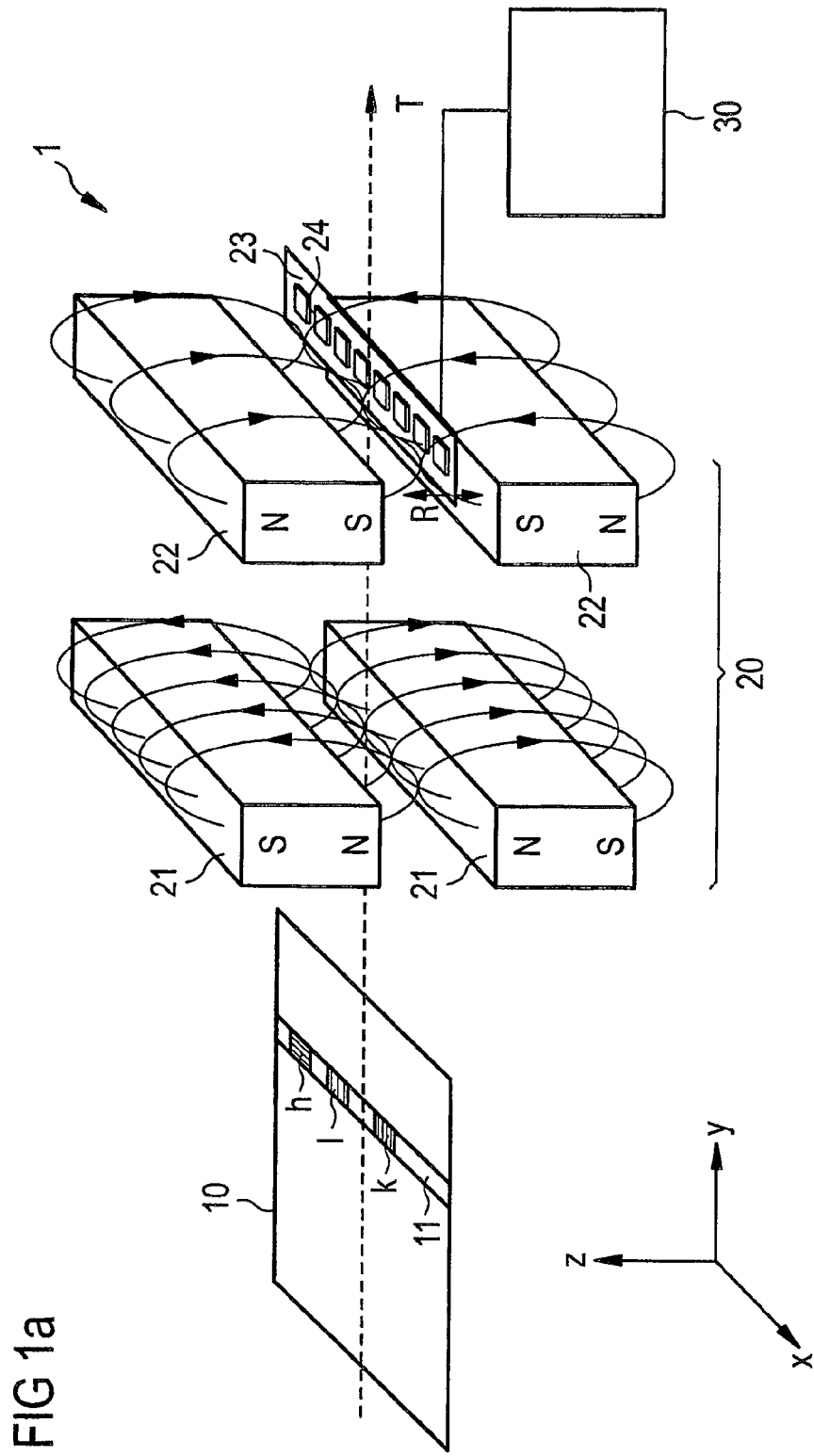
FIG. 1a: a checking apparatus according to the invention for checking a security element according to a first embodiment.

FIG. 1a shows a checking apparatus 1 according to the invention for checking a value document 10 having a security element 11 arranged thereon or therein. The value document 10 can be e.g. a bank note, and the security element 11 a security strip applied thereon or a security thread embedded therein, e.g. a windowed thread. The security element 11 has a high-coercivity magnetic region h formed from a high-coercivity magnetic material (corresponding to the above-described first magnetic region), a low-coercivity magnetic region l formed from a low-coercivity magnetic material (corresponding to the above-described second magnetic region), and a combined magnetic region k formed from the two above-mentioned magnetic materials (corresponding to the above-described third magnetic region). The terms "low-coercivity" and "high-coercivity" are intended here to express merely that the high-coercivity magnetic material has a greater coercive field strength than the low-coercivity magnetic material. In the present case the magnetic materials are incorporated into the security element 11. Alternatively, they can also be imprinted or otherwise applied on the security element 11, the value document 10 or another object in any arbitrary way. The magnetic regions h, l, k can be arranged in an arbitrary position relative to each other.

The checking apparatus 1 comprises a sensor device 20 as well as an evaluation device 30. The sensor device 20 in turn comprises in this exemplary embodiment a first magnetization device 21, a second magnetization device 22 and a magnetic sensor 23 spatially resolving in the x direction (sensor line) having sensor elements 24. The two magnetization devices 21 and 22 together form a magnetization apparatus.

As mentioned hereinabove, the magnetic regions h, k, l can be arranged in an arbitrary relative position on the value document. Consequently, they can lie in an arbitrary orientation to the sensor 23 and to the y direction in which the value document is transported along the transport path T for its check. For example, the magnetic regions h, k, l can form a sequential code of a security strip or security thread serving as a security element 11, and the thread or strip can lie perpendicularly, parallel or at an arbitrary other angle to the longitudinal direction of the sensor 23. In particular, the security strip or security thread can also extend in the y direction, i.e. the transport direction. Instead of the sensor 23 spatially resolving in the x direction there can accordingly also be employed a non-spatially-resolving sensor (corresponding to a single sensor element 24), which can then accordingly only capture magnetic signals along a single track. Then the security element would be checked along its longitudinal direction, and a spatial resolution of the regions h, k, l be obtained by time correlation of the measurement signals. As a sensor element 24 there can be employed in principle any arbitrary magnetic sensor having a pre-specified sensitivity direction, in particular: a Hall sensor, a usual inductive sensor (e.g. a coil in which a current is induced) or also an arbitrary MR (magnetoresistance) sensor, in particular a GMR (giant magnetoresistance) sensor or an AMR (anisotropic magnetoresistance) sensor.

The checking method according to the invention according to FIG. 9 will be explained hereinafter in connection with the checking apparatus from FIG. 1a. In the method, the value document 10 is transported in the y direction along the transport path T for its check in FIG. 1a. In so doing, all three above-mentioned magnetic regions h, k, l are first magnetized in the positive y direction by the first magnetization device 21 consisting of two permanent magnets (step S1).

The first magnetization device 21 supplies for this purpose a first magnetic field region in a first region of the transport line T. Before said magnetic field region, regarded in the transport direction, there first lies a magnetic field region (not represented) generated by the first magnetization device 21 and extending in the negative y direction. Said region is followed by the first magnetic field region extending in the positive y direction and having a first magnetic field strength which is greater than the coercive field strengths of the two magnetic materials. The above-mentioned first magnetic field strength is at least 1.5, preferably at least 1.75, or even at least 2, times as great as the greater of the two coercive field strengths of the magnetic materials, in order for the two magnetic materials to be magnetized as strongly as possible in the positive y direction of said first magnetic field region, whereby in the present case the magnetizations present due to the upstream magnetic field region extending in the negative y direction are aligned nearly completely in said direction (step S1 in FIG. 9). The second magnetization device 22 comprises less strong magnets, and supplies the second magnetic field region downstream of the first magnetic field region. Before the second magnetic field region there first acts a magnetic field region having a magnetic field strength (not shown) extending in the positive y direction and generated by the second magnetization device, but which does not change the magnetic materials magnetized in the positive y direction. In the subsequent second magnetic field region there then prevails a magnetic field extending in the negative y direction. The (second) magnetic field strength of said second magnetic field region extending in the negative y direction is greater (in terms of absolute value) than the coercive field strength of the low-coercivity magnetic material, but smaller than the coercive field strength of the high-coercivity magnetic material. Accordingly, only the low-coercivity magnetic material is remagnetized in the negative y direction by the second magnetization device (step S2 in FIG. 9).

The magnetic sensor 23 then captures the magnetic signals emanating from the magnetic regions h, k, l of the security element 11 while the security element is still subjected in the second magnetic field region to the second magnetic field strength (step S3).

The captured magnetic signals are subsequently evaluated by the evaluation device 30 (step S4), which ascertains the type of the magnetic regions h, k, l on the basis of the signal course, e.g. on the basis of the signal shape and/or the signal strength, and determines the arrangement of the magnetic regions h, k, l on the security element 11 on the basis of the signal location. As an evaluation device 30 there can be used e.g. a computer having an analog-to-digital converter which compares the captured signal with deposited threshold values which have been determined e.g. on the basis of empirical values or simulations. The captured signal can be preprocessed before the threshold value comparison, e.g. with filterings or also methods of pattern recognition or other suitable algorithms.

Alternatively or in addition, the signal shape can be compared with corresponding empirical values or simulated data. Upon the evaluation it is to take into consideration, e.g. by a corresponding choice of the threshold values, that the signal of a combined magnetic region strongly depends on the respective area densities with which the two magnetic materials are applied one over the other or mixed with each other. That is to say, the signal can strongly depend on corresponding manufacturing tolerances (e.g. print tolerances in the case of printing). Such effects can be optimally taken into consideration by suitable training data, as are commonly used in so-called "machine learning" methods.

Figure 10:
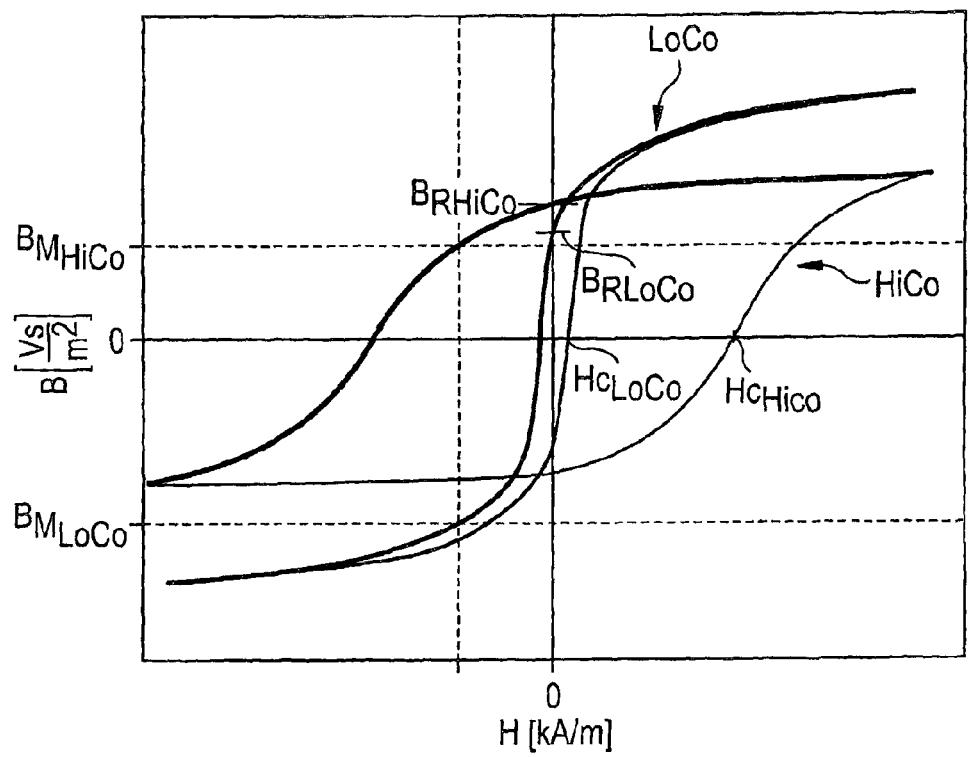
FIG. 10: magnetization curves of a high-coercivity and of a low-coercivity magnetic material.

As mentioned hereinabove, the sensor 23 captures the magnetic signals in step S3 while the security element 11 previously premagnetized in the first magnetic field region is still located in the second magnetic field region by which the low-coercivity magnetic material was remagnetized. This makes it possible to also reliably detect combined magnetic regions k, as explained hereinafter on the basis of FIG. 10. In FIG. 10 are schematically represented the magnetization curves of the low-coercivity magnetic material, designated as LoCo, and of the high-coercivity magnetic material, designated as HiCo. The magnetic flux density B brought about by the external magnetic field and the respective magnetic material located therein is plotted here over the magnetic field strength H of the external magnetic field (which is supplied e.g. in the first or second magnetic field region).

By being brought into the first magnetic field region having the first magnetic field strength (step S1), which in the present case is assigned a positive sign, the two magnetic materials are premagnetized. The first magnetic field strength is for this purpose greater than the two coercive field strengths $H_{C\,LoCo}$ of e.g. 8 to 32 kA/m (approx. 100-400 Oe (oersted)) and $H_{C\,HiCo}$ of e.g. 160 kA/m to 400 kA/m (approx. 2000 to 5000 Oe) of the two magnetic materials. Preferably, the corresponding magnetic field strength is at least 1.5 or 1.75 or even 2 times as great.

After the security element 11 has been removed from the first magnetic field region again, the two magnetic materials effectuate the remanence flux densities $B_{R\,HiCo}$ and $B_{R\,LoCo}$.

Then the security element is subjected to the second magnetic field strength, pointing in the opposite direction, of the second magnetic field region, said strength being lower in terms of absolute value and amounting for example to −100 kA/m to −150 kA/m or also only −20 kA/m to −150 kA/m. The external second magnetic field strength acting on the magnetic materials inverts the magnetization of the low-coercivity material having the coercive field strength $H_{C\,LoCo}$ nearly completely, while it influences the magnetization of the high-coercivity material having the coercive field strength $H_{C\,HiCo}$ only slightly, or nearly not at all depending on the employed material. As can be taken from the figure, the absolute amounts of the thereby resulting magnetic flux densities $B_{M\,HiCo}$ and $B_{M\,LoCo}$ of the two materials located in the second magnetic field region strongly differ from each other. Accordingly, the combined magnetic region of the magnetic encoding can also be detected well, since the magnetic signals of the two superimposed magnetic materials do not cancel each other out. All three magnetic regions h, k, l can already be distinguished on the basis of the amplitudes and the signs of the respective magnetic signals (i.e. by means of threshold values).

Figure 1B:
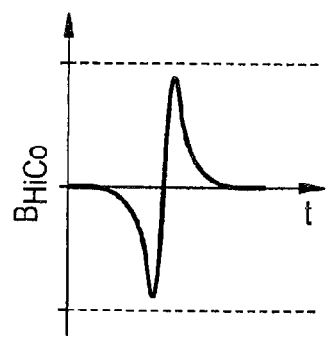
FIGS. 1b, 1c, 1d: magnetic signals captured by the checking apparatus according to the first embodiment.
Figure 1C:
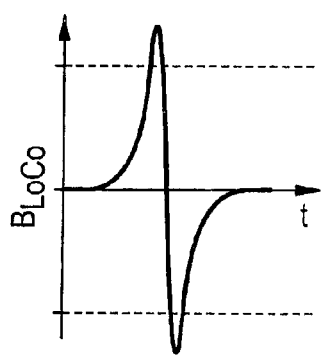
Figure 1D:
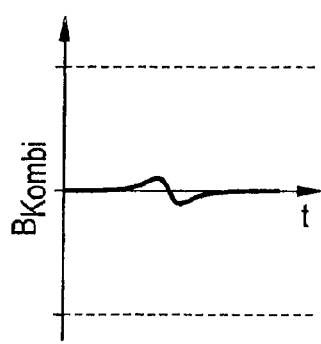

This is more precisely evident in FIGS. 1b, 1c and 1d, in which corresponding captured magnetic signals are represented. The magnetic signal captured in the present case is the magnetic flux B generated by the magnetization of the respective magnetic region on the sensor in the capture direction. Alternatively, a signal proportional thereto can e.g. also be captured. FIG. 1b shows the magnetic signal $B_{HiCo}$ of the high-coercivity magnetic region h, FIG. 1c the magnetic signal $B_{LoCo}$ of the low-coercivity magnetic region l, and FIG. 1d the magnetic signal $B_{Kombi}$ of the combined magnetic region k, with 100% of the area densities of the high-coercivity material and of the low-coercivity material of the regions h and k being respectively printed over each other in the combined areal region k. The sensor's capture direction R, which is also shown in FIG. 1a, extends perpendicularly to the magnetic field direction of the magnetic region having the second magnetic field strength and perpendicularly to the transport plane. As evident from the figures, the magnetic signals of the high-coercivity region h and of the low-coercivity region l are inverse to each other and differ furthermore in their absolute value. Upon superimposition of the two materials—having approximately the same area density—the signals accordingly do not cancel each other out completely, but rather there remains the detectable signal of a combined magnetic region k, said signal being represented in FIG. 1d.

When the security element is subsequently removed from the second magnetic field region, the two magnetic materials have remanences with a similar absolute value. The high-coercivity magnetic material is remagnetized at best slightly by the weak second magnetic field strength, so that after removal from the second magnetic field region it has a positive remanence which is equal to or slightly smaller than $B_{R\,HiCo}$. The low-coercivity magnetic material is remagnetized nearly completely by the second magnetic field strength, so that after removal from the second magnetic field region it has a negative remanence whose absolute value is somewhat smaller than the lower intersection point of the magnetization curve LoCo with the vertical axis. As to be taken from FIG. 10, the two remanences accordingly possess approximately the same absolute value and nearly cancel each other out—in dependence on any productionrelated fluctuations in material fractions—upon superimposition of the two materials. Accordingly, magnetic signals emanating from the combined magnetic regions k would not be detectable in this situation. However, the combined magnetic regions can be detected relatively well according to the inventive method, in which the security element is still located in the second magnetic field region upon detection of the magnetic signals.

Figure 2A:
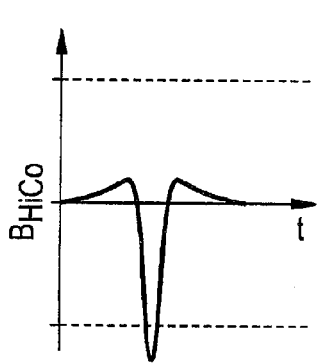
FIGS. 2a, 2b, 2c: magnetic signals captured by a checking apparatus according to a second embodiment.
Figure 2B:
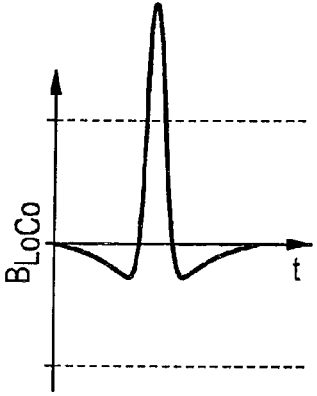
Figure 2C:
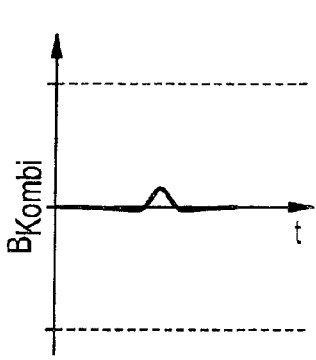

In FIGS. 2a, 2b and 2c are represented corresponding magnetic signals of the three magnetic regions h, k, l for a checking apparatus according to a second embodiment not explicitly represented. Said checking apparatus corresponds to the checking apparatus 1 of the first embodiment, the only difference being that in the second embodiment the sensitivity direction of the sensor 23 is parallel to the second magnetic field strength, namely, extends in or opposite to the transport direction T. The resultant magnetic signals have substantially only one great peak, i.e. they are less complex than in the first embodiment and hence easier to evaluate. However, in the second embodiment the second magnetic field strength can disturb the sensor 23, e.g. overdrive it.

In the first and the second embodiment, the first and the second magnetic field strength extend in or opposite to the y direction and thus parallel to the transport direction T and parallel to the principal plane of the value document 10 or of the security element 11 (the principal plane designating the plane in which the planar value document or security element substantially extends). Such magnetic fields can be respectively generated by a simple magnet pair with little effort, as represented.

Likewise with little effort, a magnetic field extending in or opposite to the z direction can be generated by means of a magnet pair. In FIG. 3a is represented a corresponding checking apparatus 1' according to a third embodiment, in which the first magnetization device 21' consists of a corresponding magnet pair in which unlike poles face each other. The corresponding magnetic field direction then extends perpendicularly to the principal plane of the security element 11 (and of the value document 10), i.e. in the z direction. The second magnetization device 22' comprises only a single magnet. Even if the magnetic field direction extends obliquely to the z axis in edge regions of the magnetic field generated by said magnet, it extends substantially opposite to the z direction in the second magnetic field region which is located in the middle of a core region of said magnetic field.

Figure 3B:
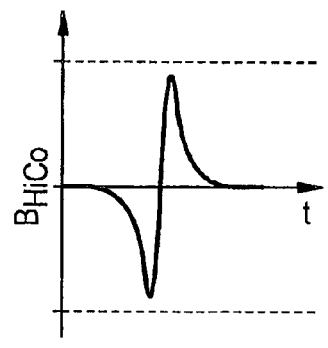
FIGS. 3b, 3c, 3d: magnetic signals captured by the checking apparatus according to the third embodiment.
Figure 3C:
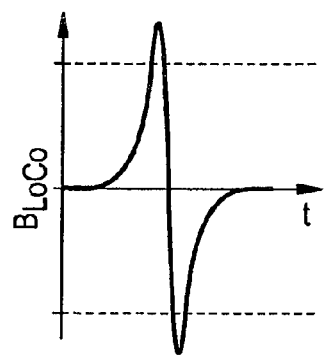
Figure 3D:
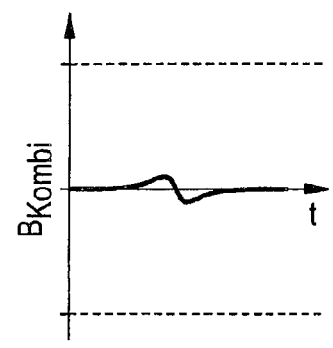

In the third embodiment according to FIG. 3a, the detection direction R extends, in analogy to the embodiment of FIG. 1a, perpendicularly to the second magnetic field strength, i.e. parallel to the transport direction T here. Moreover, in the third embodiment, analogously to the first embodiment, the low-coercivity magnetic material is remagnetized in a direction extending opposite to the premagnetization direction. Consequently, the resultant magnetic signals represented in FIGS. 3b, 3c and 3d resemble those of FIGS. 1b, 1c and 1d.

Figure 4A:
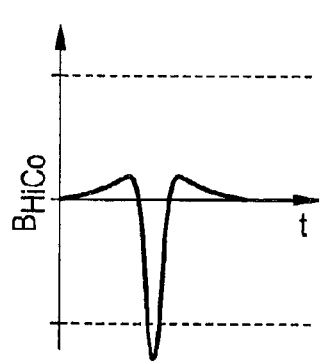
FIGS. 4a, 4b, 4c: magnetic signals captured by a checking apparatus according to a fourth embodiment.
Figure 4B:
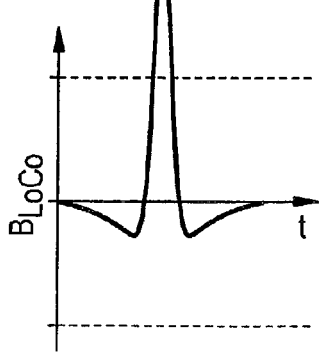
Figure 4C:
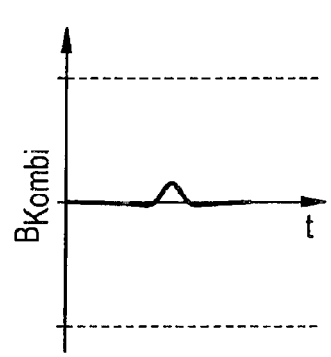

The checking apparatus according to a fourth, not explicitly represented embodiment is constructed similarly to that of the third embodiment, the only difference being that the detection direction R extends parallel to the second magnetic field strength. Accordingly, in this embodiment, in analogy to the second embodiment, the direction of the second magnetic field strength extends opposite to the premagnetization direction, and the detection direction R parallel to the second magnetic field strength. Hence, the resultant magnetic signals represented in FIGS. 4a, 4b, 4c resemble those of FIGS. 2a, 2b, 2c.

Figure 5A:
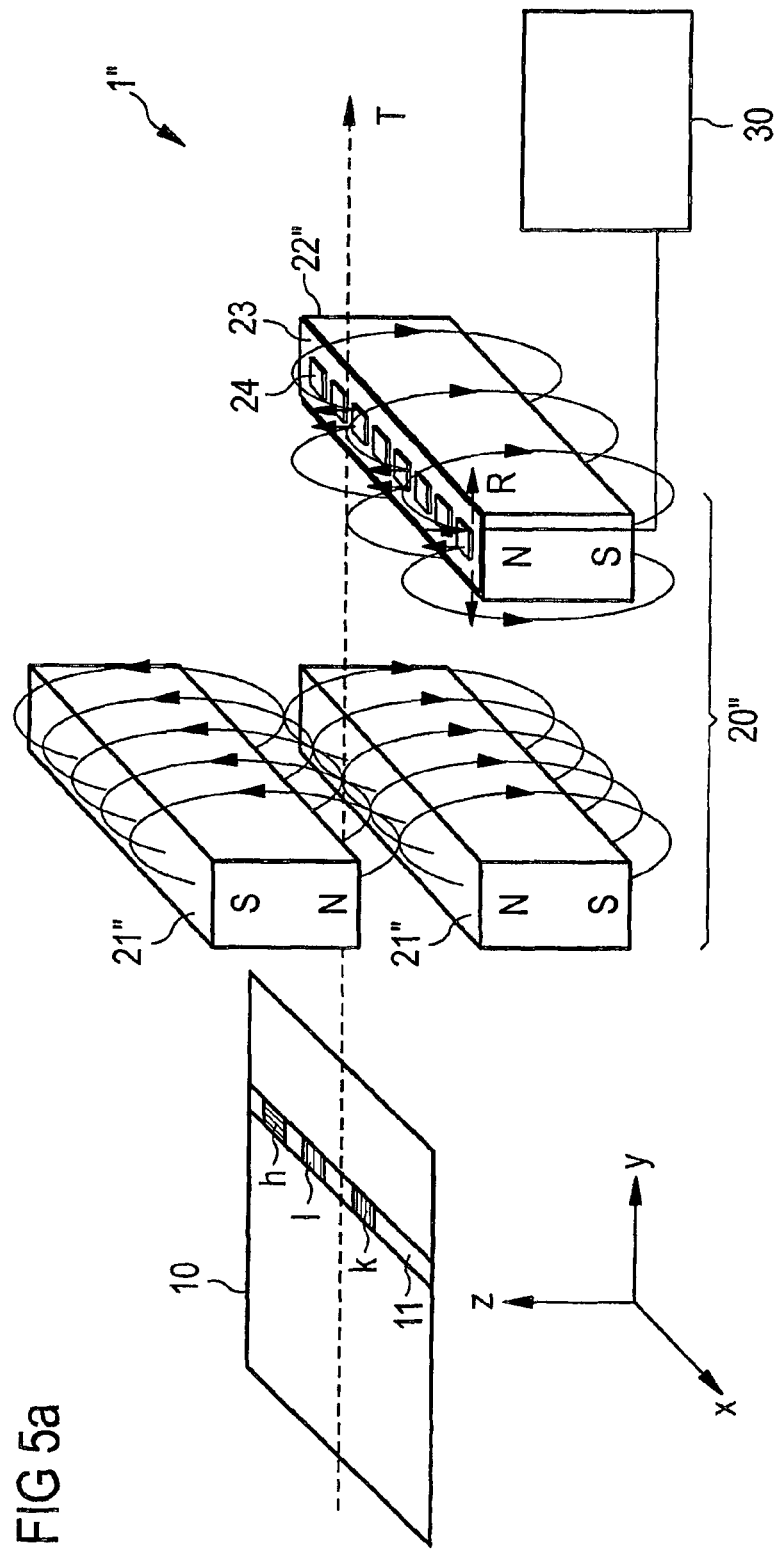
FIG. 5a: a checking apparatus according to the invention for checking a security element according to a fifth embodiment.
Figure 5B:
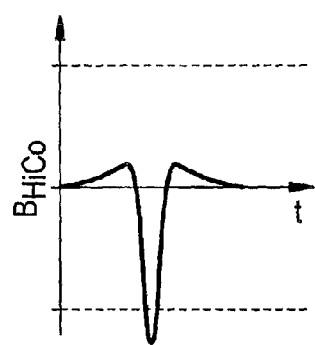
FIGS. 5b, 5c, 5d: magnetic signals captured by the checking apparatus according to the fifth embodiment.
Figure 5C:
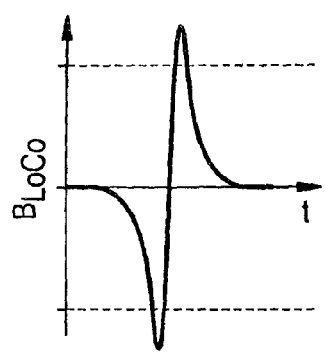
Figure 5D:
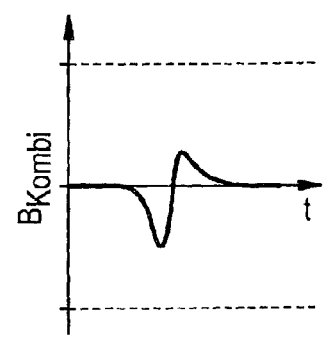

In the above-described embodiments, the direction of the second magnetic field strength is always opposite to that of the first magnetic field strength or the premagnetization direction, so that the absolute values of the magnetic signals of the high- and the low-coercivity magnetic material or of the corresponding magnetic regions h, l strongly differ, but the shape of the respective curves does not. Rather, the two signals are always similar in their course with reversed signs. In FIG. 5a is represented a further embodiment of a checking apparatus 1" according to the invention, in which the magnetic field region having the second magnetic field strength acting on the magnetic regions during the check extends perpendicularly to the premagnetization direction. The second magnetization arrangement 22" consists here only of a single magnet. The magnetic field generated by said magnet points substantially in the z direction in a core region in which the sensor elements of the sensor are located, as is evident in the figure. This orientation of the second magnetic field strength acting on the magnetic regions during the check, perpendicularly to the premagnetization direction, has the consequence that the magnetic signals of the high-coercivity magnetic region h and of the low-coercivity magnetic region l of the security element, which are represented in FIGS. 5b and 5c (captured with a sensitivity direction R of the magnetic sensor 23 extending perpendicularly to the second magnetic field strength, namely, in or opposite to the transport direction T), differ fundamentally in their shape. Consequently, there also results from the superimposition of said two signals a clear magnetic signal of the combined magnetic region k, as represented in FIG. 5d.

Figure 6A:
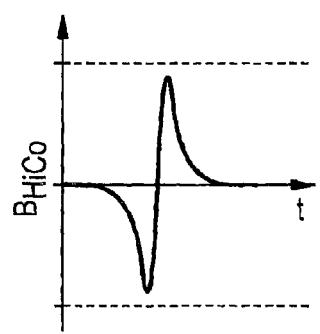
FIGS. 6a, 6b, 6c: magnetic signals captured by a checking apparatus according to a sixth embodiment.
Figure 6B:
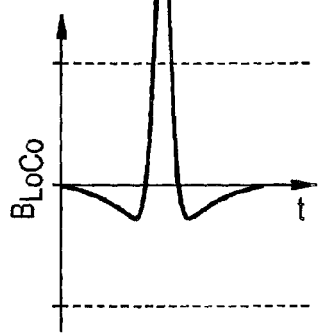
Figure 6C:
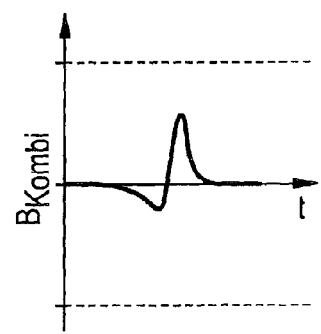

FIGS. 6a, 6b and 6c show corresponding magnetic signals for a checking apparatus according to a sixth, not explicitly represented embodiment, which corresponds to the fifth embodiment apart from the sole difference that in the sixth embodiment the sensitivity direction R of the magnetic sensor 23 extends parallel to the magnetic field region having the second magnetic field strength, i.e. perpendicularly to the transport plane.

Figure 7A:
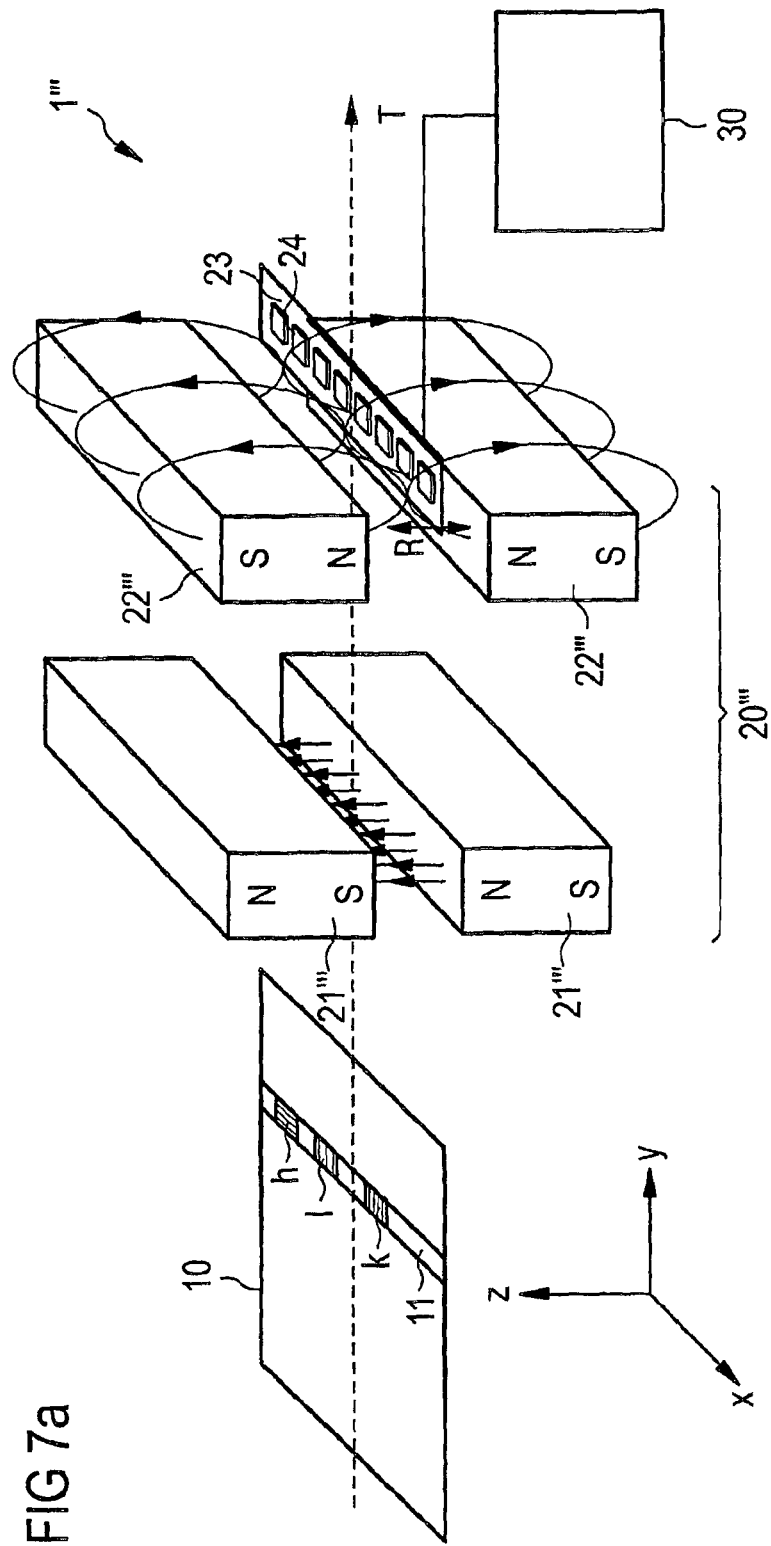
FIG. 7a: a checking apparatus according to the invention for checking a security element according to a seventh embodiment.
Figure 7B:
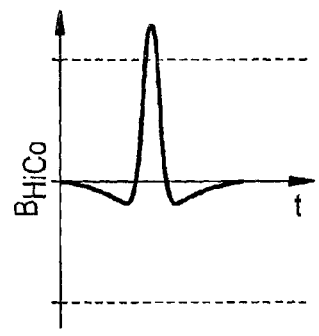
FIGS. 7b, 7c, 7d: magnetic signals captured by the checking apparatus according to the seventh embodiment.
Figure 7C:
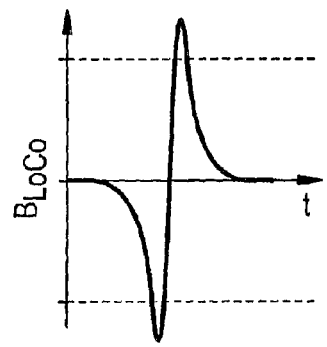
Figure 7D:
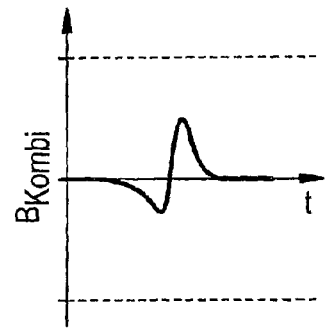
Figure 8A:
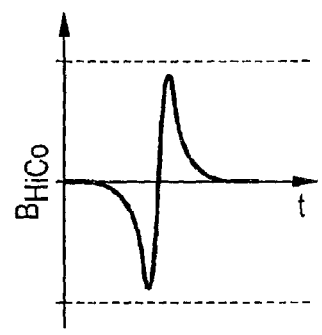
FIGS. 8a, 8b, 8c: magnetic signals captured by a checking apparatus according to an eighth embodiment.
Figure 8B:
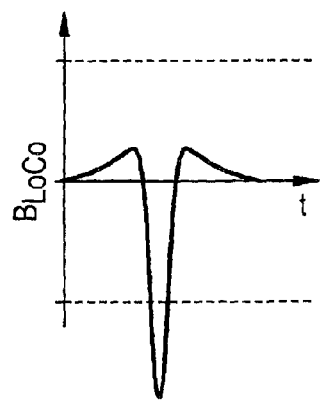
Figure 8C:
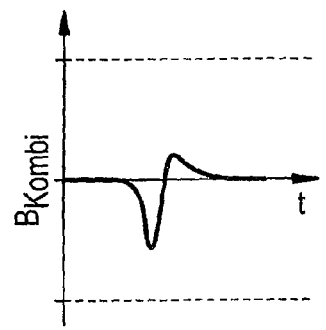

In FIG. 7a is represented a further, seventh embodiment in which—analogously to the fifth and the sixth embodiment—the second magnetic field strength extends perpendicularly to the premagnetization direction. In FIGS. 7b, 7c and 7d are represented the corresponding magnetic signals for a detection direction R extending perpendicularly to the second magnetic field strength, i.e. perpendicularly to the transport plane. In FIGS. 8a, 8b and 8c are represented corresponding magnetic signals for a (not explicitly represented) alternative detection direction R extending parallel to the second magnetic field strength—namely, in or opposite to the transport direction R—according to a further, eighth embodiment.

All above represented embodiments are configured such that the two magnetic field directions of the two magnetic field regions extend perpendicularly or parallel to the principal plane of the security element. Moreover, the two magnetic field directions are mutually perpendicular or are anti-parallel. Although these above enumerated alignments of the magnetic field directions relatively to each other and/or relatively to the principal plane of the security element are preferred embodiments, the two magnetic field directions can be aligned arbitrarily to each other and relatively to the principal plane of the security element as long as they are not identical, i.e. parallel to each other. Accordingly, the magnetization devices represented in the previous figures can e.g. also be rotated around the x axis.

Instead of the permanent magnets of the magnetization devices 21, 21', 21", 21'", 22, 22', 22", 22'" of the above-described embodiments, there can of course also be employed electromagnets, in particular coils.

In all above-described exemplary embodiments, the security element 11 was moved along the transport line T past the sensor device 20, 20', 20", 20'" (or, more strictly speaking, moved therethrough). Alternatively, the sensor device can of course also be moved accordingly. Likewise, the method according to the invention can also be performed without any relative motion, by the two magnetic field regions having the corresponding first and second magnetic field strengths being supplied at the same location in the respective magnetic field direction in temporal succession, e.g. by means of electromagnets which are successively activated accordingly.

Figure 11:
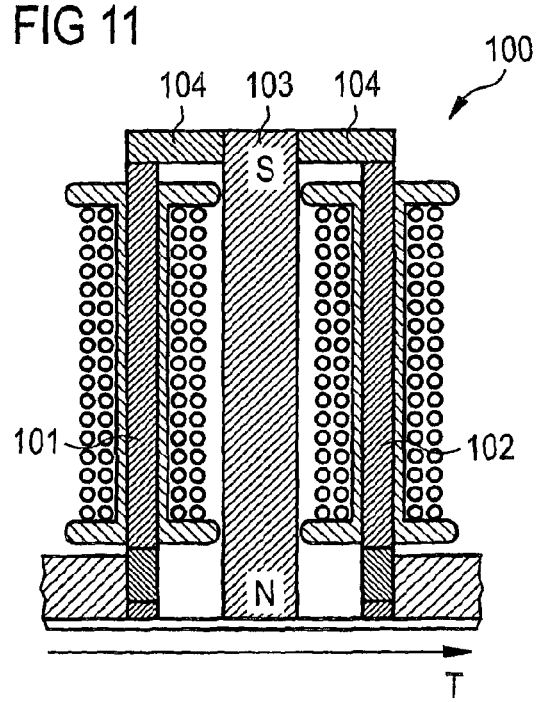
FIG. 11: a magnetic sensor having an integrated permanent magnet.

Also, there can be employed a sensor that already contains a (permanent) magnet as a functional member of the sensor. Said magnet can be simultaneously utilized as a functional constituent of the magnetization apparatus, in particular of the second magnetization arrangement. Accordingly, such a sensor contains the second magnetization device. Such a special sensor 100 is represented in FIG. 11. The sensor 100 comprises in particular a first coil 101 having a soft iron core, a second coil 102 having a soft iron core, a permanent magnet 103 made of NdFeB and two soft iron elements 104 which generate a magnetic yoke between the soft iron cores of the coils 101, 102 and the magnet 103.

The permanent magnet can supply a magnetic field having a magnetic field strength H of 400 kA/m. Due to the total construction, however, there is present on the transport line T only a magnetic field having a maximum magnetic field strength of approx. 100 kA/m to 150 kA/m. Each of the two coils is adapted to measure the magnetic flux density generated by the magnetization of the security element, ideally in the middle between the coils. For filtering out disturbances there can be evaluated, alternatively or additionally to the single signals of the two coils 101, 102, also a difference signal formed therefrom. Accordingly, the represented sensor 100 is relatively complex in construction, but it is also especially reliable.

In the above-described embodiments, both magnetic materials have a coercive field strength that is significantly greater than zero. Instead of the low-coercivity magnetic material having the coercivity stated by way of example, there can alternatively also be employed a soft-magnetic magnetic material having a coercive field strength of zero or near zero. The magnetization of said magnetic material—in contrast to the higher-coercivity first magnetic material—is aligned in the second magnetic field in the second magnetic field direction and is thereby detectable. Such soft-magnetic materials are used in magnetic inks with which security features can be printed. Thus, corresponding regions of a security element that are printed with such inks can be localized with the present invention.

Different soft-magnetic materials having different permeabilities can be distinguished here on the basis of the strength of the respective magnetic signals.

In FIGS. 12a, 12b, 12c, 12d, 12e, 13, 14a, 14b, 15 and 16 are represented sensor devices 20"", 20""' in which the two magnetic field regions are generated by means of only a single permanent magnet 25 or two permanent magnets 25 and 27 arranged on opposing sides of the transport line T. In the sectionally represented sensor device 20"" in FIG. 12a, two permanent magnets 25 are arranged such that their unlike poles face each other. Between said poles lies the first magnetic field region having the comparatively strong first magnetic field strength. The two magnets are moreover connected to an arrangement 26 made of magnetically conductive material which "guides" the magnetic field lines of the total magnetic field generated by the two magnets 25. The magnetically conductive material may be e.g. a ferromagnetic material, particularly preferably a soft-magnetic material, such as an (inexpensive) transformer steel. A major part of the magnetic field lines is guided by a second portion 26b of the arrangement 26, said portion being upstream of the magnets 25 along the transport line T and having a small interruption in the transport path, and a smaller part is guided by a first portion 26a of the arrangement 26, said portion being downstream of the magnets regarded along the transport line T. The above-mentioned downstream portion 26a likewise has an interruption in the region of the transport line T. Since the latter interruption is clearly greater than that of the second portion 26b, however, it conducts a part of the magnetic field lines that is smaller in comparison to the upstream portion. Varying the size of this recess can thus vary the second magnetic field strength. If a relatively great recess is required for suitably adjusting the second magnetic field strength, the recess is preferably generated substantially below the transport line, in order to prevent the distance of the sensor 23 from the value document 10 transported past from becoming too great. With the first portion 26a there is supplied in the region of its recess the second magnetic field region. Accordingly, the sensor 23 is also arranged within said recess, so that it captures magnetic signals emanating from the second magnetic field region. The magnetization apparatus of the sensor device 20"" in FIG. 12a thus consists of merely two permanent magnets 25 and the arrangement 26 of magnetically conductive material.

Figure 12A:
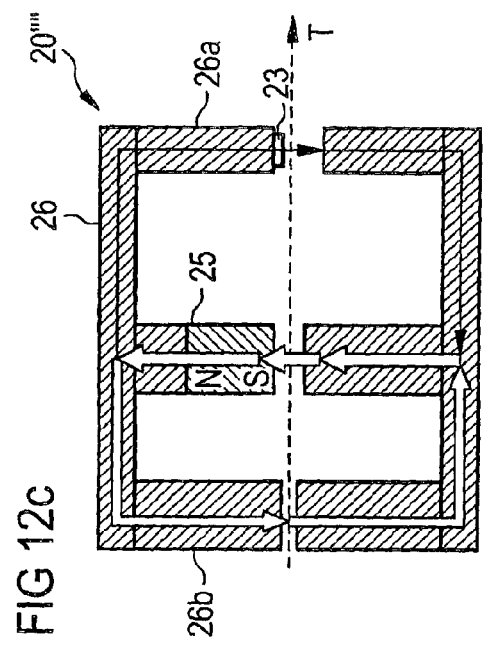
FIGS. 12a, 12b, 12c, 12d, 12e: sensor devices in which both the first magnetic field region and the second magnetic field region are generated by means of a single magnet or two magnets arranged on both sides of the transport line T, FIG. 13 a sensor device constructed analogously to those of FIGS. 12a, 12b, 12c, 12d and 12e but in which a substantial part of a magnetic flux is not guided and extends through the environment of the sensor device, FIGS. 14a, 14b a sensor device constructed analogously to those of FIGS. 12a, 12b, 12c, 12d and 12e but in which a magnetic flux is guided laterally of the transport line T, FIG. 15 a sensor device that is constructed similarly to one of those of FIGS. 12a, 12b, 12c, 12d and 12e, and FIG. 16 a further sensor device in which both the first magnetic field region and the second magnetic field region are generated by means of a single magnet or two magnets arranged on both sides of the transport line T.
Figure 12B:
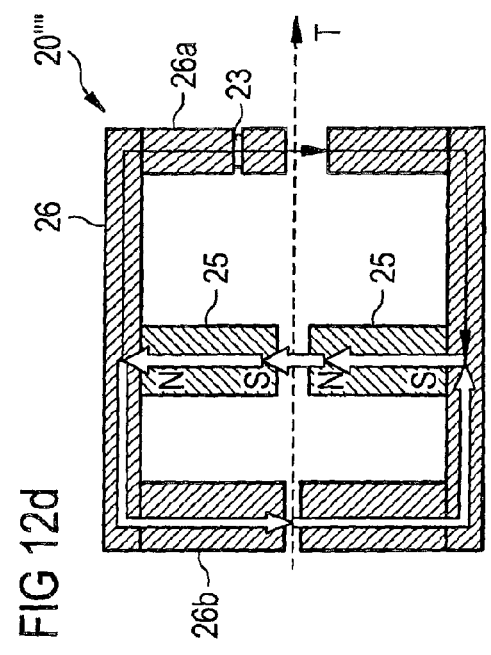

The sensor device 20"" shown in FIG. 12b is substantially identical to that represented in FIG. 12a. It differs, however, in that the two magnets 25 are somewhat smaller, with the arrangement made of magnetically conductive material being suitably shaped to nevertheless guide the field lines of the magnets 25 suitably.

Figure 12C:
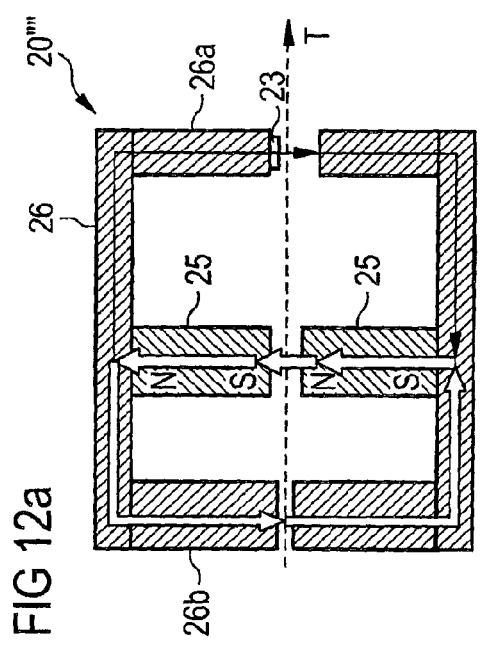

The sensor device shown in FIG. 12c is constructed identically to that in FIG. 12b, the only difference being that it possesses only one permanent magnet 25, which alone is strong enough to supply the first magnetic field region. The second magnetic field region is supplied as in FIGS. 12a and 12b by suitable guidance of the magnetic field lines via the arrangement 26 made of magnetically conductive material.

Figure 12D:
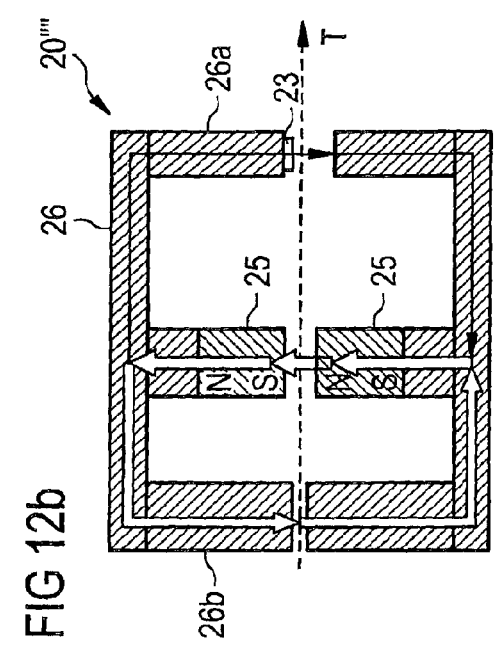

The sensor device in FIG. 12d is constructed identically to that in FIG. 12a, the only difference being that the sensor is not arranged directly over the second magnetic field region, but is integrated into the first portion 26a of the arrangement 26. Since the arrangement 26a consists of magnetically conductive material, magnetic field changes brought about by the security element are nevertheless relayed to the sensor 23, which can accordingly capture magnetic signals emanating from security elements arranged in the second magnetic field region. It has turned out that integrating the sensor 23 into the magnetic path, as represented in FIG. 12d, strongly reduces interferences (spurious signals) that otherwise superimpose the captured magnetic signal. This works especially well when the magnetic field strength of the second magnetic field region is clearly smaller than that of the first magnetic field region, e.g. amounts to merely one hundredth thereof. It has moreover turned out that such strong differences of the two magnetic field strengths are expedient in particular when the first magnetic material is a soft-magnetic magnetic material.

Figure 12E:
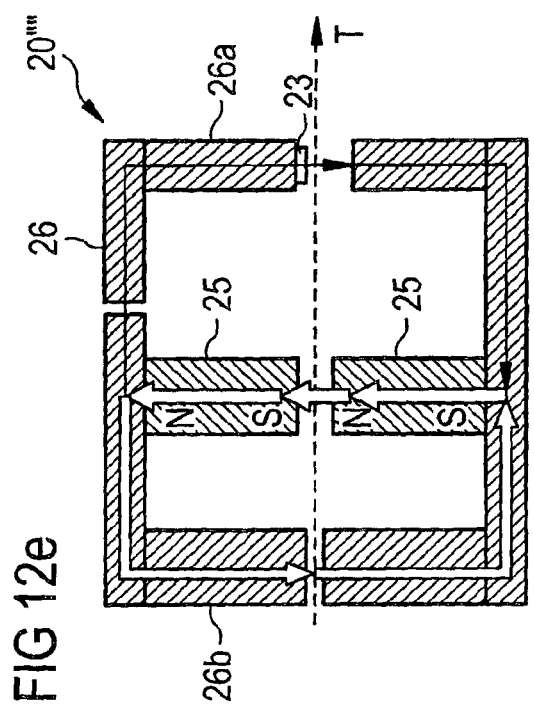

The sensor device in FIG. 12e is likewise constructed in principle identically to that in FIG. 12a, the only difference being that the first portion 26a of the arrangement made of magnetically conductive material has a further recess or interruption in the upper region. Said further recess additionally reduces the second magnetic field strength.

Figure 13:
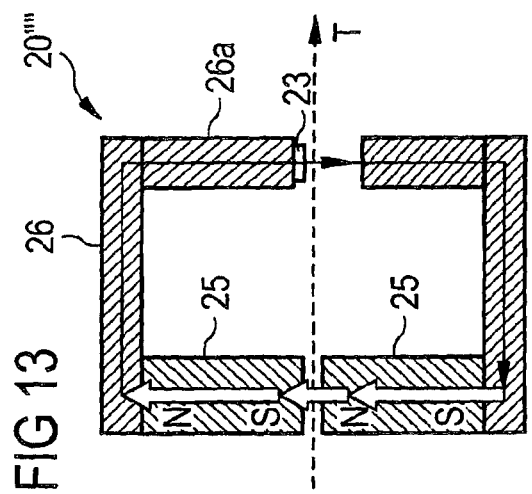

FIG. 13 shows a modification of the sensor device 20'''' from FIG. 12a. The sensor device 20'''' of FIG. 13 differs in that the second portion 26b of the arrangement 26 made of magnetically conductive material is not present. In this arrangement, only a small part of the magnetic field lines is accordingly guided via the arrangement 26 made of magnetically conductive material, namely, the part that at the same time generates the second magnetic field region. The large part of the magnetic field lines, which is guided by the second portion 26b of the arrangement 26 made of magnetically conductive material in FIG. 12a, extends through the environment, e.g. through the air, in the present embodiment represented in FIG. 13. Accordingly, in the present embodiment, the material for the second portion 26b can be saved. However, somewhat stronger magnets 25 may be required in some cases, depending on the specific configuration. Altogether, the second portion 26b can thus also be omitted in the embodiments of FIGS. 12a to 12d.

Figure 14A:
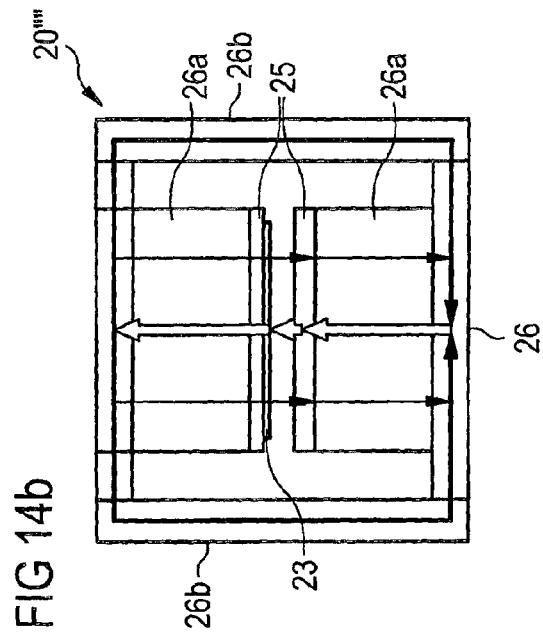
Figure 14B:
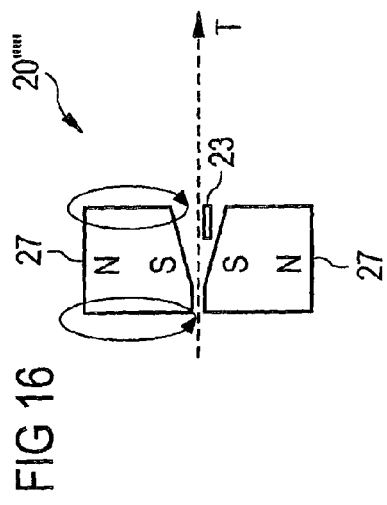

In FIGS. 14a and 14b is represented a further modification of the sensor device 20'''' from FIG. 12a in cross section from the side (FIG. 14a) and as a front view (FIG. 14b), i.e. viewed from the direction opposite to the transport direction regarded along the transport path T. The sensor device 20'''' of FIGS. 14a and 14b differs in that the second portion 26b of the arrangement 26 made of magnetically conductive material does not conduct the magnetic field lines through the transport path T (before the first magnetic field region), but guides them laterally past the transport path T. As a result, the sensor device 20'''' is more compact in the transport direction, and the magnetic total resistance of the flux guide formed by the second portion 26b and the magnets 25 is especially small, even when comparatively little magnetically conductive material is employed (e.g. when the lateral flux guide consists of relatively thin steel).

Figure 15:
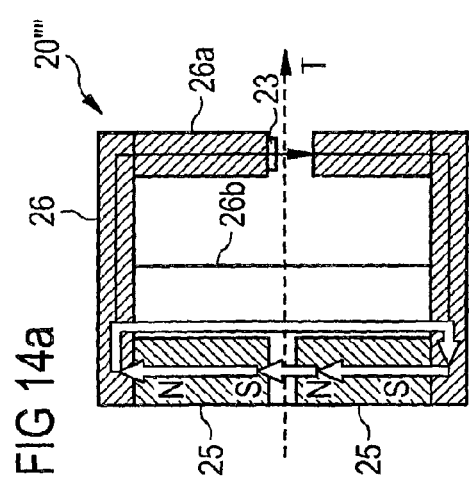

The sensor device 20'''' represented in FIG. 15 also generates the two magnetic field regions by means of a permanent magnet 25 and an arrangement 26 made of magnetically conductive material. However, it is constructed fundamentally differently from the sensor devices of FIGS. 12a, 12b, 12c, 12d, 12e, 13, 14a and 14b. In the sensor device 20'''' according to FIG. 15 there is generated directly at the permanent magnet 25 the second magnetic field region in whose proximity the sensor 23 is arranged, and via the arrangement 26 made of magnetically conductive material there is generated the first magnetic field region. In the first magnetic field region a greater magnetic field strength nevertheless prevails than in the second magnetic field region, since the arrangement 26 made of magnetically conductive material bundles the magnetic field lines at the first magnetic field region into a smaller region than at the second magnetic field region.

The features of the embodiments represented in FIGS. 12a, 12b, 12c, 12d, 12e, 13, 14a, 14b and 15 can of course also be combined suitably with each other. For example, in the sensor device 20'''' represented in FIG. 15 there can also be present two permanent magnets arranged on both sides of the transport line T, e.g. an additional magnet on the side of the transport line T opposing the magnet 25

Figure 16:
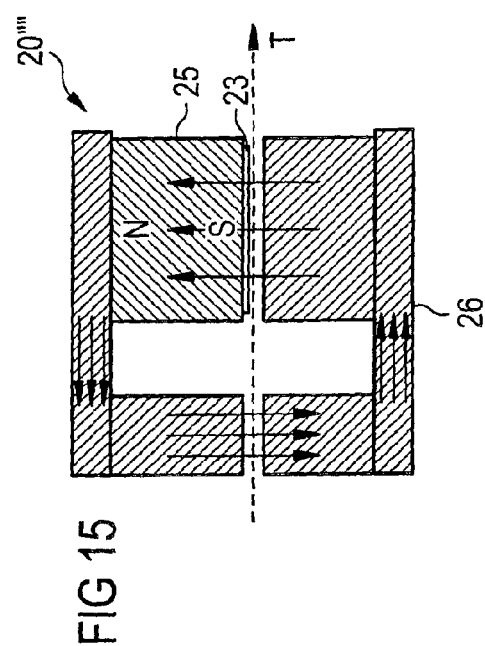

The magnetization apparatus of the sensor device 20 in FIG. 16 comprises merely two suitably shaped permanent magnets 27. Since the gap therebetween is smaller in the front region of the magnetization apparatus than in the rear region, regarded along the transport line T, the magnetic field strength of the magnetic field aligned in the transport direction T in the corresponding front first magnetic field region is greater than the magnetic field strength of the magnetic field aligned opposite to the transport direction T in the corresponding rear second magnetic field region.

The permanent magnets 25, 27 can also be assembled from a plurality of single bodies. Instead of the permanent magnets 25, 27 there can moreover also be employed corresponding electromagnets.

The invention claimed is:

1. A method for checking a security element which has at least a first magnetic material having a first coercive field strength and a second magnetic material having a second coercive field strength which is smaller than the first coercive field strength, with the security element comprising at least a first magnetic region which has the first and not the second magnetic material, at least a second magnetic region which has the second and not the first magnetic material, and no or at least a third magnetic region which has both the first and the second magnetic material, comprising the following steps:
   subjecting the security element to a first magnetic field region having a first magnetic field direction and a first magnetic field strength which is greater than the first and the second coercive field strength, such that both the first magnetic material and the second magnetic material are premagnetized in a first magnetization direction,
   subjecting the security element to a second magnetic field region, having a second magnetic field direction which is different from the first magnetic field direction, and a second magnetic field strength which is greater than the second coercive field strength and is smaller than the first coercive field strength, such that the second magnetic material is aligned by the second magnetic field region in a second magnetization direction which differs from the first magnetization direction, while the first magnetic material remains premagnetized in the first magnetization direction,
   capturing a magnetic signal from at least one of the magnetic regions of the security element while the security element is subjected to the second magnetic field region, and
   evaluating the magnetic signal,
   wherein in the evaluating step it is derived from the captured magnetic signal, without any further magnetic signals of the magnetic regions being captured and evaluated, whether the relevant magnetic region is a first magnetic region or a second magnetic region, and wherein it is derived from the captured magnetic signal, without any further magnetic signals of the magnetic regions being captured and evaluated, whether the relevant magnetic region is a third magnetic region, where applicable.

2. The method according to claim 1, wherein the second magnetic field region lies in a core region of a magnetic field generated by a magnetization apparatus, there being present in the second magnetic field region a magnetic field strength that amounts to at least 25%, of a local maximum magnetic field strength of the magnetic field generated by the magnetization apparatus.

3. The method according to claim 1, wherein the security element is subjected to the second magnetic field region when the first magnetic material and second magnetic material are still premagnetized in a first magnetization direction.

4. The method according to claim 3, wherein in the step of evaluating the magnetic signal a position of the relevant magnetic region is ascertained.

5. The method according to claim 1, wherein the security element is subjected to the second magnetic field region having the second magnetic field strength such that the magnetic field direction of the second magnetic field region extends substantially opposite to the first magnetization direction.

6. The method according to claim 1, wherein the security element is subjected to the second magnetic field region having the second magnetic field strength such that the magnetic field direction of the second magnetic field region extends substantially perpendicularly to the first magnetization direction.

7. The method according to claim 1, wherein in the step of capturing the magnetic signal a magnetic flux density generated by the magnetization of the security element is captured in a direction extending substantially perpendicularly to the magnetic field direction of the second magnetic field region.

8. The method according to claim 1, wherein in the step of capturing the magnetic signal a magnetic flux density generated by the magnetization of the security element is captured in a direction extending substantially parallel or anti-parallel to the magnetic field direction of the second magnetic field region.

9. The method according to claim 1, wherein the security element is subjected to the second magnetic field region of the second magnetic field strength such that the magnetic field direction of the second magnetic field region extends substantially perpendicularly or substantially parallel to a principal plane of the security element.

10. The method according to claim 1, wherein a security element of a value document or security article is checked.

11. A checking apparatus for checking a security element, the security element having at least a first magnetic material having a first coercive field strength and a second magnetic material having a second coercive field strength which is smaller than the first coercive field strength, with the security element comprising at least a first magnetic region which has the first and not the second magnetic material, at least a second magnetic region which has the second and not the first magnetic material, and no or at least a third magnetic region which has both the first and the second magnetic material, the checking apparatus comprising:
 a transport line along which the security element is movable in a transport direction,
 a magnetization apparatus which is adapted:
  to supply a first magnetic field region having a first magnetic field direction and a first magnetic field strength in a region of the transport line such that magnetic material, located in the first magnetic field region, of a security element to be checked is magnetizable in a first magnetization direction, and
  to supply a second magnetic field region downstream of the first magnetic field region along the transport line and having a second magnetic field direction which is different from the first magnetic field direction, and a second magnetic field strength which is smaller than the first magnetic field strength, such that magnetic material, located in the second magnetic field region, of a security element to be checked is magnetizable in a second magnetization direction differing from the first magnetization direction,
 a sensor for capturing a magnetic signal from at least one of the magnetic regions of the security element to be checked, which sensor is adapted to capture magnetic signals emanating from the second magnetic field region, and
 an evaluation device,
wherein
the evaluation device is adapted to derive from the captured magnetic signal, without evaluating any further magnetic signals of the magnetic regions, whether the relevant magnetic region is a first magnetic region or a second magnetic region, and is adapted to derive from the captured magnetic material, without evaluating any further magnetic signals of the magnetic regions, whether the relevant magnetic region is a third magnetic region, where applicable.

12. The checking apparatus according to claim 11, wherein the second magnetic field region lies in a core region of a total magnetic field generated by the magnetization apparatus, there being present in the second magnetic field region a magnetic field strength that amounts to at least 25%, of a local maximum magnetic field strength of the magnetic field generated by the magnetization apparatus.

13. The checking apparatus according to claim 11, wherein the magnetization apparatus comprises a permanent or electromagnet arranged on one side of the transport line, which generates or predominantly generates both the first and the second magnetic field region, or comprises two permanent or electromagnets arranged on opposing sides of the transport line, which cooperatively generate or predominantly generate both the first and the second magnetic field region.

14. The checking apparatus according to claim 11, wherein the checking apparatus is adapted to perform a method for checking a security element which has at least a first magnetic material having a first coercive field strength and a second magnetic material having a second coercive field strength which is smaller than the first coercive field strength, with the security element comprising at least a first magnetic region which has the first and not the second magnetic material, at least a second magnetic region which has the second and not the first magnetic material, and no or at least a third magnetic region which has both the first and the second magnetic material, comprising the following steps:
 subjecting the security element to a first magnetic field region having a first magnetic field direction and a first magnetic field strength which is greater than the first and the second coercive field strength, such that both the first magnetic material and the second magnetic material are premagnetized in a first magnetization direction,
 subjecting the security element to a second magnetic field region, having a second magnetic field direction which is different from the first magnetic field direction, and a second magnetic field strength which is greater than the second coercive field strength and is smaller than the first coercive field strength, such that the second magnetic material is aligned by the second magnetic field region in a second magnetization direction which differs from the first magnetization direction, while the first magnetic material remains premagnetized in the first magnetization direction,
 capturing a magnetic signal from at least one of the magnetic regions of the security element while the security element is subjected to the second magnetic field region, and
 evaluating the magnetic signal,
wherein in the evaluating step it is derived from the captured magnetic signal, without any further magnetic signals of the magnetic regions being captured and evaluated, whether the relevant magnetic region is a first magnetic region or a second magnetic region, and wherein it is also derived from the captured magnetic signal, without any further magnetic signals of the magnetic regions being captured and evaluated, whether the relevant magnetic region is a third magnetic region, where applicable.

15. A sensor device for checking a security element which has a plurality of magnetic regions having magnetic materials of different coercive field strength, comprising:

a magnetization apparatus which is adapted to supply a first magnetic field region having a first magnetic field direction and a first magnetic field strength in a first region of a transport line for the security element to be checked, such that magnetic material, located in the first magnetic field region, of a security element to be checked is magnetizable in a first magnetization direction, and to supply a second magnetic field region, downstream of the first magnetic field region, in a second region of the transport line having a second magnetic field direction which is different from the first magnetic field direction, and a second magnetic field strength which is smaller than the first magnetic field strength, such that magnetic material, located in the second region, of the security element to be checked is magnetizable in a second magnetization direction differing from the first magnetization direction, and a sensor for capturing a magnetic signal from at least one of the magnetic regions of the security element to be checked, which sensor is adapted to capture magnetic signals emanating from the second magnetic field region, wherein the magnetization apparatus comprises a permanent or electromagnet arranged on one side of the transport line, which generates or predominantly generates both the first and the second magnetic field region, or comprises two permanent or electromagnets arranged on opposing sides of the transport line, which cooperatively generate or predominantly generate both the first and the second magnetic field region.

* * * * *